(12) United States Patent
Kamiya et al.

(10) Patent No.: US 7,157,125 B2
(45) Date of Patent: Jan. 2, 2007

(54) DOUBLED-FACED TAPE

(75) Inventors: Kenji Kamiya, Kanuma (JP);
Kazumoto Shinojima, Suwa (JP)

(73) Assignees: Sony Chemicals Corporation, Tokyo (JP); Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/468,732

(22) PCT Filed: Feb. 25, 2002

(86) PCT No.: PCT/JP02/01650

§ 371 (c)(1),
(2), (4) Date: Aug. 22, 2003

(87) PCT Pub. No.: WO02/066570

PCT Pub. Date: Aug. 29, 2002

(65) Prior Publication Data

US 2004/0076768 A1    Apr. 22, 2004

(30) Foreign Application Priority Data

Feb. 23, 2001  (JP)  .............................. 2001-102141

(51) Int. Cl.
*B32B 7/10* (2006.01)
(52) U.S. Cl. .................. 428/1.5; 428/1.3; 428/343; 428/354; 349/64; 349/65; 349/112; 349/113; 349/122

(58) Field of Classification Search ................. 428/1.5, 428/1.3, 1.33, 317.3, 317.5, 343; 349/64–65, 349/112–113, 122
See application file for complete search history.

(56) References Cited

U.S. PATENT DOCUMENTS 3,282,176 A * 11/1966 Morse et al. ................ 396/315

(Continued)

FOREIGN PATENT DOCUMENTS

JP    02-115887    4/1990

(Continued)

OTHER PUBLICATIONS

Mark Alger, Polymer Science Dictionary, 2nd edition, 1997, p. 328.*

(Continued)

*Primary Examiner*—Rena Dye
*Assistant Examiner*—Sow-Fun Hon
(74) *Attorney, Agent, or Firm*—Oliff & Berridge, PLC

(57) ABSTRACT

A double-faced tape according to which, in the case of fixing a liquid crystal display panel and a backlight module together using the double-faced tape, reflection of external light can be reduced as much as possible at the fixed parts, and moreover incident light from the backlight module can be reflected back toward the backlight module with high reflectance, whereby light from a light source can be used effectively; one face of the double-faced tape 10A is made to be a low-reflectance face, and the other face is made to be a high-reflectance face or high-scattering face.

5 Claims, 1 Drawing Sheet

U.S. PATENT DOCUMENTS

| | | | | |
|---|---|---|---|---|
| 4,101,698 A | * | 7/1978 | Dunning et al. | 428/31 |
| 4,699,838 A | * | 10/1987 | Gilbert | 428/201 |
| 5,202,950 A | * | 4/1993 | Arego et al. | 385/146 |
| 5,619,351 A | * | 4/1997 | Funamoto et al. | 349/61 |
| 5,739,880 A | * | 4/1998 | Suzuki et al. | 349/110 |
| 5,886,759 A | * | 3/1999 | Mashino et al. | 349/65 |
| 6,414,337 B1 | * | 7/2002 | Day et al. | 257/72 |
| 6,429,917 B1 | * | 8/2002 | Okamoto et al. | 349/110 |
| 6,573,956 B1 | * | 6/2003 | Shibata | 349/65 |

FOREIGN PATENT DOCUMENTS

| | | |
|---|---|---|
| JP | 03-191329 | 8/1991 |
| JP | 05-108011 | 4/1993 |
| JP | A 5-108011 | 4/1993 |
| JP | 06-130365 | 5/1994 |
| JP | 08-043820 | 2/1996 |
| JP | 08-054624 | 2/1996 |
| JP | A 8-43820 | 2/1996 |
| JP | A 8-54624 | 2/1996 |
| JP | 08-082716 | 3/1996 |
| JP | A 8-82716 | 3/1996 |
| JP | 08-101311 | 4/1996 |
| JP | 10-161119 | 6/1998 |
| JP | A 10-161119 | 6/1998 |
| JP | 11-296099 | 10/1999 |
| JP | 2000-089910 | 3/2000 |

OTHER PUBLICATIONS

English translation of a Japanese Office Action dated Nov. 30, 2004.

* cited by examiner

DOUBLED-FACED TAPE

This application is a 371 of PCT/JP02/01650 Feb. 25, 2002.

1. Technical Field

The present invention relates to a double-faced tape suitable for fixing a liquid crystal display panel and a backlight module together.

2. Background Art

As shown in FIG. 5, a backlight module 1 of a liquid crystal display apparatus comprises, broadly speaking, a light source 2 such as a cold cathode ray tube, a light-guiding plate 3 made of a transparent material such as an acrylic plate, a reflector 4 that reflects light that has been emitted from the light source 2 and inputs this light into an end face of the light-guiding plate 3, a reflecting plate 5 that is provided on a rear face of the light-guiding plate 3 (the face on the opposite side to a face on which a liquid crystal display panel 20 is provided), a diffusing plate 6 that is provided on an upper face of the light-guiding plate 3, and a prism sheet 7 that is provided, as required, on the diffusing plate 6. Here, the reflector 4, the reflecting plate 5 and the diffusing plate 6 are each fixed to the light-guiding plate 3 by double-faced adhesive tape 10.

Moreover, the liquid crystal display panel 20 is fixed onto the diffusing plate 6 or the prism sheet 7 by double-faced adhesive tape 10, or else is fixed to a housing on the diffusing plate 6 or the prism sheet 7 using bolts or the like (not shown).

In such a liquid crystal display apparatus provided with a backlight module 1, in order to effectively utilize the light from the light source 2, it is preferable that, in the case that light from the backlight module 1 strikes outside of the viewing area of the liquid crystal display panel 20, this light is allowed to be reflected back toward the reflecting plate 5 and to be then used inside the viewing area.

On the other hand, when viewing such a liquid crystal display panel, it is undesirable for the brightness to suddenly increase in the vicinity of the viewing area, and hence it is required to prevent unwanted external light reflection, and thus make the brightness uniform, and make the screen clear.

However, with the method in which the liquid crystal display panel 20 and the backlight module 1 are fixed together using conventional double-faced adhesive tape 10, it is not possible to fulfill these requirements around the vicinity of the viewing area using simple means.

It is thus an object of the present invention to provide a novel functional double-faced tape according to which, in the case of fixing a liquid crystal display panel and a backlight module together using the double-faced tape, reflection of external light can be reduced as much as possible at the fixed parts, and moreover incident light from the backlight module can be reflected back toward the backlight module with high reflectance, whereby light from a light source can be used effectively.

DISCLOSURE OF THE INVENTION

To attain the above object, the present invention provides a double-faced tape, wherein one face constitutes a low-reflectance face, and the other face constitutes a high-reflectance face or high-scattering face.

Moreover, the present invention provides, as a liquid crystal display apparatus in which a liquid crystal display panel and a backlight module are fixed together using double-faced tape, a liquid crystal display apparatus in which the liquid crystal display panel and the backlight module are fixed together by sticking the liquid crystal display panel to the low-reflectance face of the above-mentioned double-faced tape and sticking the backlight module to the high-reflectance face or high-scattering face.

BEST MODE FOR CARRYING OUT THE INVENTION

Figure 1:
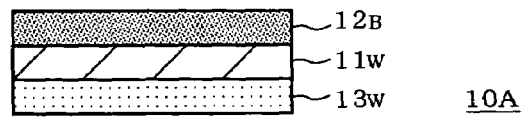
FIG. 1 is a sectional view of a double-faced tape of the present invention.

Following is a detailed description of the present invention with reference to the drawings. Note that in the various drawings, the same reference numeral represents identical or equivalent constituent elements.

FIG. 1 is a sectional view of an example of the double-faced tape of the present invention.

This double-faced tape 10A comprises a substrate $11_W$ comprising a white PET film, a black adhesive layer $12_B$ forming a low-reflectance face on one face of the substrate $11_W$, and a transparent or white adhesive layer $13_W$ forming a high-reflectance face or high-diffusion face on the other face of the substrate $11_W$.

Here, means for making the PET film used as the substrate $11_W$ be white include kneading a white paint into PET, using a foamed PET film, printing a white paint onto the PET film, and so on. In particular, if a foamed PET film is used, then surface unevenness can be formed on the substrate surface, and hence in the case of forming a transparent adhesive layer thereon, this face can be made to be a high-scattering face.

The black adhesive layer $12_B$ can be obtained by putting a black or dark-colored paint, dye, filler or the like into an adhesive resin made of an acrylic acid ester or the like, and coating onto the substrate $11_W$. It is preferable to form the black adhesive layer $12_B$ such that the visible light transmittance is not more than 0.1%.

The transparent or white adhesive layer $13_W$ can be obtained by coating a transparent adhesive resin made of an acrylic acid ester or the like, or such a transparent adhesive resin into which has been put a white paint, dye, filler or the like, onto the substrate $11_W$. In particular, in the case of making the transparent or white adhesive layer $13_W$ itself have a light-scattering ability, it is preferable to put in a light-scattering filler such as $TiO_2$.

Figure 4:
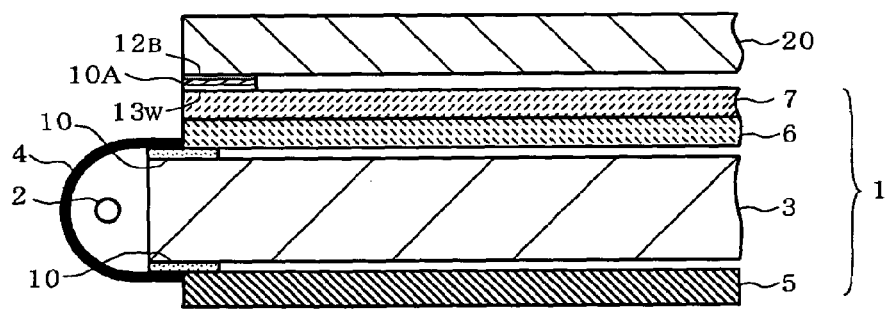
FIG. 4 is a sectional view of a structure in which a liquid crystal display panel and a backlight module are fixed together using a double-faced tape of the present invention.
Figure 5:
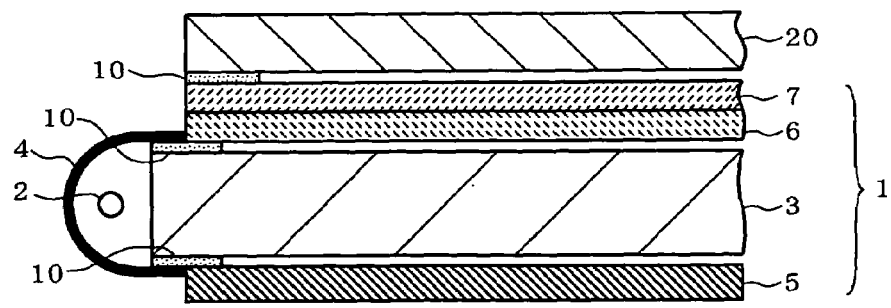
FIG. 5 is a sectional view of a structure in which a liquid crystal display panel and a backlight module are fixed together using a conventional double-faced tape.

The double-faced tape 10A is useful in the case that low reflectance of light is required of one face of the double-faced tape, and high reflectance or high scattering ability is required of the other face; for example, as shown in FIG. 4, in the case of fixing a liquid crystal display panel 20 and a backlight module 1 together using the double-faced tape 10A, it is preferable for the black adhesive layer $12_B$ to be stuck to the liquid crystal display panel 20, and the transparent or white adhesive layer $13_W$ to be stuck to the backlight module 1. As a result, when viewing the liquid crystal display panel, the effective screen frame will be surrounded by a black frame comprising the black adhesive layer $12_B$, and hence wavering of the screen can be prevented. Moreover, in the case that light from the backlight module 1 is incident on the part where the double-faced tape 10A is stuck on, the high-reflectance face or high-scattering face comprising the transparent or white adhesive layer $13_W$ will reflect this light back toward the backlight module 1, and hence this light can be made to act as illuminating light that is incident inside the viewing area; loss of light can thus be reduced. In particular, in the case that this face is constituted to be a high-reflectance face having a low scattering ability, light reflected thereat will be reflected at the reflecting plate 5 of the backlight module 1, and then this reflected light will immediately exit on the inside of the viewing area without undergoing total reflection in the light-guiding plate 3, and hence there will be a risk of a so-called white-out phenomenon occurring in which the screen brightness becomes excessively high; it is thus preferable to constitute this face to be a high-reflectance face having a high scattering ability, whereby the white-out phenomenon can be prevented.

The present invention also encompasses a liquid crystal display apparatus in which a liquid crystal display panel 20 and a backlight module 1 are fixed together using the double-faced tape 10A in this way.

The double-faced tape of the present invention can be made to have any of various forms, so long as one face thereof is made to have low reflectance, and the other face is made to have high reflectance or high scattering ability.

Figure 2:
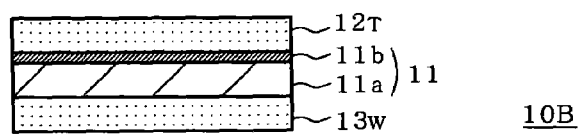
FIG. 2 is a sectional view of a double-faced tape of the present invention.

For example, as with the double-faced tape 10B shown in FIG. 2, it is possible to use a white PET film 11a having a black printed face 11b provided thereon as a substrate 11, and provide a transparent adhesive layer $12_T$ on the black printed face 11b.

Figure 3:
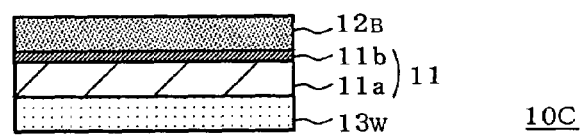
FIG. 3 is a sectional view of a double-faced tape of the present invention.

Moreover, in the case of using a white PET film 11a having a black printed face 11b provided thereon as a substrate 11, it is possible to provide a black adhesive layer $12_B$ on the black printed face 11b as with the double-faced tape 10C shown in FIG. 3. As a result, the face comprising the black adhesive layer $12_B$ can be made to have a yet lower reflectance.

In addition, in the double-faced tape of the present invention, the adhesive layers on the two faces of the substrate may be replaced with bonding agent layers, with the bonding agent layers similarly being made to have low reflectance, and high reflectance or high scattering ability.

Moreover, the substrate is not limited to being a PET film, but rather any of various resin films, a nonwoven cloth or the like can be used.

INDUSTRIAL APPLICABILITY

If a liquid crystal display panel and a backlight module are fixed together using the double-faced tape of the present invention, then reflection of external light can be reduced as much as possible at the fixed parts, and moreover incident light from the backlight module can be reflected back toward the backlight module with high reflectance, whereby light from a light source can be used effectively.

The invention claimed is:

1. A liquid crystal display apparatus, in which a liquid crystal display panel and a backlight module are fixed together by sticking the liquid crystal display panel to the low-reflectance face of a double-faced tape, wherein one face constitutes a low reflectance face, and the other face constitutes a high reflectance face or high scattering face and sticking the backlight module to the high-reflectance face or high-scattering face of the double-faced tape, an effective screen frame of the liquid crystal display panel being surrounded by a black frame comprising the double faced tape.

2. A liquid crystal display apparatus, in which a liquid crystal display panel and a backlight module are fixed together by sticking the liquid crystal display panel to the low-reflectance face of a double-faced tape, wherein one face constitutes a low reflectance face, and the other face constitutes a high reflectance face or high scattering face, the low reflectance face comprises a black adhesive layer provided on a substrate, and sticking the backlight module to the high-reflectance face or high-scattering face of the double-faced tape, an effective screen frame of the liquid crystal display panel being surrounded by a black frame comprising the double faced tape.

3. A liquid crystal display apparatus, in which a liquid crystal display panel and a backlight module are fixed together by sticking the liquid crystal display panel to the low-reflectance face of a double-faced tape wherein one face constitutes a low reflectance face, and the other face constitutes a high reflectance face or high scattering face, the low reflectance face comprises a transparent adhesive layer provided on a black printed face of a substrate having the black printed face on one face thereof, and sticking the backlight module to the high-reflectance face or high-scattering face of the double-faced tape, an effective screen frame of the liquid crystal display panel being surrounded by a black frame comprising the double faced tape.

4. A liquid crystal display apparatus, in which a liquid crystal display panel and a backlight module are fixed together by sticking the liquid crystal display panel to the low-reflectance face of a double-faced tape wherein one face constitutes a low reflectance face, and the other face constitutes a high reflectance face or high scattering face, the high-reflective face or high-scattering face comprises a white adhesive layer provided on a substrate and sticking the backlight module to the high-reflectance face or high-scattering face of the double-faced tape, an effective screen frame of the liquid crystal display panel being surrounded by a black frame comprising the double faced tape.

5. A liquid crystal display apparatus, in which a liquid crystal display panel and a backlight module are fixed together by sticking the liquid crystal display panel to the low-reflectance face of a double-faced tape wherein one face constitutes a low reflectance face, and the other face constitutes a high reflectance face or high scattering face, the high-reflectance face or high-scattering face comprises a transparent adhesive layer provided on a substrate comprising white foamed PET film and sticking the backlight module to the high-reflectance face or high-scattering face of the double-faced tape, an effective screen frame of the liquid crystal display panel being surrounded by a black frame comprising the double faced tape.

* * * * *